United States Patent
Endres et al.

(10) Patent No.: US 10,196,743 B2
(45) Date of Patent: Feb. 5, 2019

(54) HIGHLY ABRASION-RESISTANT ANTI-LIMESCALE LAYERS WITH HIGH CHEMICAL RESISTANCE

(71) Applicant: EPG (ENGINEERED NANOPRODUCTS GERMANY) AG, Griesheim (DE)

(72) Inventors: Klaus Endres, Homburg (DE); Christian Schmidt, Saarbrücken (DE); Luis Genolet, Saarbrücken (DE); Barbara Kutzky, Saarbrücken (DE); Heike Schneider, Saarbrücken (DE)

(73) Assignee: EPG (ENGINEERED NANOPRODUCTS GERMANY) AG, Griesheim (DE)

( * ) Notice: Subject to any disclaimer, the term of this patent is extended or adjusted under 35 U.S.C. 154(b) by 631 days.

(21) Appl. No.: 14/646,477

(22) PCT Filed: Nov. 20, 2013

(86) PCT No.: PCT/EP2013/074298
§ 371 (c)(1),
(2) Date: May 21, 2015

(87) PCT Pub. No.: WO2014/079893
PCT Pub. Date: May 30, 2014

(65) Prior Publication Data
US 2015/0315390 A1 Nov. 5, 2015

(30) Foreign Application Priority Data

Nov. 21, 2012 (DE) ........................ 10 2012 022 731

(51) Int. Cl.
| | | |
|---|---|---|
| C23C 18/12 | (2006.01) | |
| B32B 15/04 | (2006.01) | |
| C09D 5/16 | (2006.01) | |
| C08K 5/06 | (2006.01) | |
| C08K 3/22 | (2006.01) | |
| B32B 17/06 | (2006.01) | |
| B32B 17/10 | (2006.01) | |
| B32B 27/20 | (2006.01) | |
| B05D 5/08 | (2006.01) | |

(52) U.S. Cl.
CPC .............. *C23C 18/122* (2013.01); *B05D 5/08* (2013.01); *B32B 15/04* (2013.01); *B32B 17/06* (2013.01); *B32B 17/061* (2013.01); *B32B 17/10009* (2013.01); *B32B 17/10091* (2013.01); *B32B 27/20* (2013.01); *C08K 3/22* (2013.01); *C08K 5/06* (2013.01); *C09D 5/1675* (2013.01); *C23C 18/1204* (2013.01); *C23C 18/125* (2013.01); *C23C 18/127* (2013.01); *C23C 18/1208* (2013.01); *C23C 18/1212* (2013.01); *C23C 18/1216* (2013.01); *C23C 18/1225* (2013.01); *C23C 18/1229* (2013.01); *C23C 18/1245* (2013.01); *C23C 18/1254* (2013.01); *C23C 18/1262* (2013.01); *C23C 18/1283* (2013.01); *C08K 2003/2227* (2013.01); *Y10T 428/1317* (2015.01); *Y10T 428/25* (2015.01); *Y10T 428/265* (2015.01); *Y10T 428/266* (2015.01); *Y10T 428/31612* (2015.04)

(58) Field of Classification Search
CPC ............ C23C 18/1204; C23C 18/1208; C23C 18/1212; C23C 18/1216; C23C 18/122; C23C 18/1225; C23C 18/1229; C23C 18/1245; C23C 18/125; C23C 18/1254; C23C 18/1262; C23C 18/127; B32B 15/04; B32B 17/06; B32B 17/061; B32B 17/10009; B32B 17/10091; B32B 27/20
See application file for complete search history.

(56) References Cited

U.S. PATENT DOCUMENTS 3,971,747 A 7/1976 Bank et al.
4,533,573 A 8/1985 Perfetti
(Continued)

FOREIGN PATENT DOCUMENTS

CN 100558833 C 11/2009
DE 202 19 218 U1 3/2003
(Continued)

OTHER PUBLICATIONS

Jun. 30, 2016 Office Action issued in European Partent Application No. 13826841.2.
Howland et al., "The Formation of Scale from Hard Waters at Temperatures Below the Boiling Point," J. Appl. Chem., Jul. 1951, vol. I, pp. 320-328.
Jun. 20, 2014 International Search Report issued in International Application No. PCT/EP2013/074298.
May 25, 2015 International Preliminary Report on Patentability issued in International Application No. PCT/EP2013/074298.

*Primary Examiner* — Walter Aughenbaugh
(74) *Attorney, Agent, or Firm* — Oliff PLC

(57) ABSTRACT

The invention relates to the use of a coating of a layer including an inorganic, glass-like matrix of an alkali silicate and/or alkaline earth silicate or a layer including an inorganic-organic hybrid matrix or of a double layer of a base layer including an inorganic, glass-like matrix of an alkali silicate and/or alkaline earth silicate or a base layer including an inorganic-organic hybrid matrix and an alkali silicate-free and alkaline earth silicate-free top layer including a matrix of an oxidated silicon compound as the anti-limescale coating on at least one metal surface or inorganic surface of an object or material. The anti-limescale coating can be used for storage or transport devices for water or media containing water. The anti-limescale coating is suitable for pipelines, sand control systems or safety valves in the conveyance of oil or gas or the storage of oil or gas.

16 Claims, No Drawings

(56) References Cited

U.S. PATENT DOCUMENTS

| | | | | |
|---|---|---|---|---|
| 9,458,539 | B2* | 10/2016 | Schmidt | A47J 36/025 |
| 2013/0020335 | A1 | 1/2013 | Schmidt et al. | |
| 2014/0196898 | A1* | 7/2014 | Tanguay | C09K 8/70 |
| | | | | 166/280.2 |

FOREIGN PATENT DOCUMENTS

| | | |
|---|---|---|
| DE | 10 2004 001 097 A1 | 7/2005 |
| DE | 10 2006 018 938 A1 | 10/2007 |
| DE | 10 2007 059 423 A1 | 6/2009 |
| DE | 10 2008 011 413 A1 | 9/2009 |
| DE | 10 2010 011 185 A1 | 9/2011 |
| EP | 0 113 189 A1 | 7/1984 |
| FR | 2 757 501 A1 | 6/1998 |
| FR | 2 806 427 A1 | 9/2001 |
| WO | 2005/066388 A2 | 7/2005 |
| WO | 2009/130288 A1 | 10/2009 |
| WO | 2011/069663 A2 | 6/2011 |

* cited by examiner

HIGHLY ABRASION-RESISTANT ANTI-LIMESCALE LAYERS WITH HIGH CHEMICAL RESISTANCE

The invention relates to the use of special layers as anti-limescale layers, storage and transport devices for water or water-containing media such as water-containing crude oil or natural gas, which have such anti-limescale layers, and to a method for transporting or storing water or water-containing media.

Limescale deposits or buildups of limescale are a precipitation of insoluble carbonates and sulphates from hard water, attaches to the inside of boilers, pipelines or valves, for example safety valves, as fixed crusts. The limescale deposit and the associated damage to the boiler or pipe wall or the valves can lead to dramatic damage through to functional failure of the equipment and components.

The production of limescale deposits on metal or ceramic surfaces depends on several factors, which are described, for example, in A. H. Howland et al., J. Appl. Chem. 1951, pages 320-327. In addition to the contents such as, for example, salts such as $CaCO_3$, which are contained in the water, their solubility behaviour, the nucleation and the crystal growth also, of course, play a decisive role during the buildup of the coating layers. A further decisive parameter is the chemical, physical or mechanical adherence of the contamination to the surface.

While the contents in the water can generally not be influenced in many applications, the other parameters can be influenced with a suitable coating. The fewer crystallisation nuclei that are present or formed on the surfaces, the smaller is the formation of a coating layer. If a limescale covering layer should nevertheless form, this can be removed more easily from the surface in the case of poor adhesion. This poor adhesion can be achieved by surfaces that are as smooth as possible, so a smaller true surface is achieved and the possibility of settling in pores, holes or scratches is reduced or eliminated, and can above all be achieved by preventing chemical adhesion.

Anti-limescale coatings are coatings on a surface, which, in comparison to the surface without an anti-limescale layer of this type, reduce or prevent limescale deposits on the surface and/or allow a facilitated removal of limescale covering layers that have been produced.

Possible coating materials, which satisfy the above-mentioned requirements, are principally metal coatings, which are applied galvanically or by vacuum techniques, or ceramic layers. In the case of metallic coatings, hard temperature-resistant layers can be produced, which are generally, however, non-transparent and special systems, the integration of which in production sequences is expensive, have to be available to apply them.

Non-oxidated materials, especially, appear suitable in the case of ceramic layers. These extremely hard and abrasion-resistant layer materials lead to a smoothing of the metal surface and, because of the non-oxidated character, to poor attachment of the limescale coating layers. However, complex and expensive equipment is required for application, which takes place by means of CVD or PVD.

Thin, transparent glass-like layers based on sol-gel systems and nano-scale systems can be produced by means of wet-coating methods. A coating technology is described in DE-A-10 2004001097 or WO-A-2005066388, with which thin layers of only a few μm can be obtained on metal surfaces. Despite this small thickness, the layers are very abrasion-resistant and cannot be scratched, for example with corundum-containing scrubbing sponges. Layers of this type, which allow the production of inorganic crack-free coatings on glass and metal, in contrast to the inorganic layers described in the prior art, in which a critical layer thickness of a maximum of 100 to 300 nm can be achieved, can achieve layer thicknesses of up to 10 μm.

Thus, a coating system for high-grade steel 1.4301 is known, which allows crack-free transparent glass-like layers with a layer thickness of about 5 μm.

The layers do not exhibit any visible or measurable abrasion after 1,000 cycles of the Taber abrasion test (friction wheel CS-10F, load 500 g).

The drawback in these materials is their inadequate hydrolytic stability for certain applications, especially at relatively high temperatures and their inadequate abrasion resistance for certain applications; in other words, materials of this type have limited resistance in acidic but, especially, in alkaline media. The layer materials described above may, for example, be dissolved in diluted caustic soda at a slightly elevated temperature. Thus, layers of this type can only be used to a limited extent for application under elevated temperatures and in alkaline media.

As is known from the published sol-gel literature, the chemical resistance of such layers can be improved by the use of ions, which act as crosslinking catalysts. These may, for example, be iron, aluminium, zirconium or titanium. However, additives of this type, as also known from the sol-gel literature, influence the processing properties of the coating paints owing to their catalytic crosslinking acceleration.

The aim of the invention was to provide a coating system as an anti-limescale coating for metal or ceramic surfaces, which reduces or prevents the attachment and buildup of limescale deposits and/or allows easier removal of limescale coating layers that have been produced. The coating system is also to allow a transparent, translucent or coloured coating and is to be able to be applied by means of a wet-chemical coating method. Moreover, it should be made possible to use coatings of this type in media, in which a high hydrolytic stability is required. Moreover, the coating system is to have a high abrasion resistance.

Surprisingly, it was possible to address the aim by using a coating of a layer comprising an inorganic, glass-like matrix of an alkali silicate and/or alkaline earth silicate or a layer comprising an inorganic-organic hybrid matrix or of a double layer of a base layer comprising an inorganic, glass-like matrix of an alkali silicate and/or alkaline earth silicate or a base layer comprising an inorganic-organic hybrid matrix and an alkali silicate-free and alkaline earth silicate-free top layer comprising an inorganic, glass-like matrix of an oxidated silicon compound as the anti-limescale coating on at least one metal or inorganic surface of an object or material. The layer comprising an inorganic, glass-like matrix of an alkali silicate and/or alkaline earth silicate especially preferably comprises one or one or more fillers or pigments. A layer of this type is also called a composite layer here, as it comprises a composite of the inorganic, glass-like matrix and the filler or pigment.

Surprisingly, the coating is distinguished by a high anti-limescale effect. In the case of a calcification test on metallic components, it was possible to show that by using the above-mentioned anti-limescale coating, the calcification can be significantly reduced. Thus, the limescale deposit which, in uncoated components, was 3.5 g after 300 test cycles, could be reduced to 0.4 g in the case of coated components. Without wishing to commit to a theory, it is assumed that this can be attributed inter alia to a planarising effect of the anti-limescale layer and to the changed contact angle of the layer surface. The contact angle can be increased to 78° by the anti-limescale coating in comparison to the uncoated component, which has a contact angle of 48°.

Surprisingly, these systems are distinguished by high hydrolysis resistance, especially when the layer comprising an inorganic, glass-like matrix furthermore comprises at least one filler and/or at least one pigment. As the layer or the double layer can be wet-chemically applied, the production is also simple and economical, and objects or materials with a complex geometry can also be provided with the anti-limescale coating.

The anti-limescale coating can also be produced virtually transparently and intermediate layers can be inserted between the metal surface or the inorganic surface and the anti-limescale coating. Thus, colour effects can be produced as required by absorbing corresponding colouring means in the anti-limescale layer itself, especially in the layer comprising an inorganic, glass-like matrix of an alkali silicate and/or alkaline earth silicate or in the optional intermediate layer. Moreover, the layers can be very thin.

Very good results were achieved when the coating compositions described in DE-A-102004001097 or in DE-A-102010011185 are used for the formation of the inorganic, glass-like matrix, i.e. both for the layer comprising an inorganic, glass-like matrix of an alkali silicate and/or alkaline earth silicate and for the optional alkali silicate-free and alkaline earth silicate-free top layer comprising and inorganic, glass-like matrix of an oxidated silicon compound. The methods described there for thermal compression for these layers have also proven to be expedient. The coating composition described there for the inorganic, glass-like matrix and the method steps for application and for the thermal compression are therefore adopted here by reference. The invention will be described in detail below.

All objects or materials that consist of a metal or an inorganic material or comprise at least one metal surface or inorganic surface, for example objects or materials of another material, which is provided, on at least one surface, with a metal layer or inorganic layer or a metal component or an inorganic component, are suitable as the object or material to be coated according to the invention having at least one metal surface or inorganic surface.

In this application, metal also always includes metal alloys. Inorganic surfaces are taken to mean all inorganic surfaces here that differ from metal surfaces. Preferred examples of inorganic surfaces are surfaces made of ceramic or a mineral material. Examples of objects or materials with a mineral surface are rocks, such as gravel or grit, and sand.

The object or material with a metal surface or inorganic surface may, for example, be semi-finished products, such as plates, metal sheets, rods or wires, rock, particles, components or finished products, such as boilers, tanks and, especially, pipes, sand control systems and valves or safety valves. The object or material can be provided completely with the anti-limescale coating on the metal surface or the inorganic surface. Of course, it is also possible to only provide individual regions or parts of the metal surface or the inorganic surface with the anti-limescale coating when, for example, only certain regions require corresponding protection. For example, in the case of objects such as boilers, tanks, pipe lines and valves, especially safety valves, it may generally be sufficient if the inner surfaces or the surfaces coming into contact with water or media containing water are provided with the anti-limescale coating.

Examples of suitable metals for the metal surface of the object or material are aluminium, titanium, tin, zinc, copper, chromium or nickel, including galvanised, chrome-plated or enamelled surfaces. Examples of metal alloys are, especially, steel or high-grade steel, aluminium, magnesium and copper alloys, such as brass and bronze. Metallic surfaces made of steel, high-grade steel, galvanised, chrome-plated or enamelled steel or titanium are especially preferably used. The ceramic surface may be made of any usual ceramic, for example a conventional ceramic based on the oxides $SiO_2$, $Al_2O_3$, $ZrO_2$ or $MgO$ or the corresponding mixed oxides.

The metallic or inorganic surface may have a level or a structured surface. The geometry of the object or material or the metal or inorganic surface can be simple, for example, a simple metal sheet, but also complex, for example with edges, rounded areas, elevated areas or indentations. The metal or inorganic surface is preferably cleaned before the anti-limescale coating is applied and freed of grease and dust. Before the coating, a surface treatment, for example by corona discharge, can also be carried out. An intermediate layer, for example an adhesion-promoting layer or a coloured layer to achieve optical effects, can also be applied between the metal surface or inorganic surface and the anti-limescale coating.

In a preferred embodiment, the layer comprising an inorganic, glass-like matrix of an alkali silicate and/or alkaline earth silicate or the layer comprising an inorganic-organic hybrid matrix furthermore comprises at least one filler or at least one pigment, wherein this is especially preferred for the layer comprising an inorganic, glass-like matrix of an alkali silicate and/or alkaline earth silicate. The fillers or pigments are particles. The particles may have any desired shape. They may, for example, be spherical, block-shaped or platelet-shaped. The person skilled in the art knows that the particles can frequently have a more or less irregular shape, for example when they are present as aggregates. If no preferred directions are present, the shape of a sphere is frequently preferred to determine the size. In the case of platelet-shaped or scaly particles, two preferred directions are present.

It is especially preferred that the diameter of the filler or pigment particles or, in the case of a platelet-shaped geometry of the filler or pigment particles, the thickness of the filler or pigment particles is smaller than the layer thickness of the composite layer. The size of the fillers or pigments may vary to a broad extent depending on the anti-limescale coating used. Expediently, the diameter of the fillers and pigments used is in the range from 1 to 20 μm, more preferably from 1.5 to 15 μm, especially preferably from 2 to 10 μm and, especially, from 2.5 to 6 μm.

The diameter for non-platelet-shaped fillers or pigments, in other words, especially particles without preferred directions, is taken to mean here the mean particle diameter based on the volume average ($d_{50}$ value). This value may, for example, be determined laser-optically with a dynamic laser light scattering, for example by means of a UPA (Ultrafine Particle Analyser, Leeds Northrup).

The particle sizes of platelet-shaped fillers or pigments, i.e. the thickness and diameter, can be determined, for example, by means of light microscopy, by optical image valuation. As these are platelet-shaped particles, the diameter relates to the lateral diameter or the equivalent diameter of the circle equal to the projection area in a stable particle position. The thickness and diameter also signify here the mean thickness or the mean diameter based on the volume average ($d_{50}$ value).

All the conventional fillers or pigments known to the person skilled in the art are suitable as a filler or pigment. The filler or the pigment is preferably selected from at least one of abrasive fillers, solid lubricants and colour pigments. A filler or a pigment or mixtures of two or more fillers and/or pigments can be used. Mixtures of fillers or pigments of the same material, which differ, for example, with respect to size and/or particle shape, can also be used. Mixtures of at least one abrasive filler and at least one anti-lubricant, of at least one abrasive filler and at least one colour pigment, of at least one anti-lubricant and at least one colour pigment or a mixture of at least one abrasive filler, at least one anti-lubricant and at least one colour pigment can also be used.

The layer used alone or as a base layer comprises an inorganic, glass-like matrix or an inorganic-organic hybrid matrix. Owing to the preferred combination of this matrix with the one or more fillers or pigments contained therein, a preferably used composite layer is produced, which surprisingly has an excellent anti-limescale effect, especially when the filler or the pigment is selected from an abrasive filler, an anti-lubricant, a colour pigment and one of the aforementioned combinations of these fillers or pigments.

Fillers of an abrasive material are known to the person skilled in the art and are, for example, used as an abrasive. Transparent abrasive fillers are preferred. The abrasive fillers used, on the basis of the Moh's hardness scale, preferably have a Moh's hardness of at least 7 and preferably >7. The abrasive filler is preferably a filler made of a hard substance. A general overview and examples of abrasive materials or hard substances suitable for the present invention are to be found, for example, in "Ullmanns Encyclopädie der technischen Chemie", 4$^{th}$ edition, volume 20, "Grinding and abrasives", pages 449-455, and volume 12, "Hartstoffe (introduction)", page 523-524, Verlag Chemie, Weinheim N.Y., 1976.

Examples of hard substances are carbides, nitrides, borides, oxycarbides or oxynitrides of transition metals or semimetals, such as of Si, Ti, Ta, W and Mo, for example TiC, WC, TiN, TaN, TiB$_2$, MoSi$_2$, hard substance mixed crystals, such as TiC—WC or TiC—TiN, double carbides and complex carbides, such as Co$_3$W$_3$C and Ni$_3$W$_3$C, and intermetallic compounds, such as, for example, from the systems W—Co or Mo—Be, natural or synthetic diamond, corundum (Al$_2$O$_3$), such as, for example, emery, fused corundum or sintered corundum, natural or synthetic precious stones, such as sapphire, ruby or zirconium, boron, cubic boron nitride, boron carbide (B$_4$C), silicon carbide (SiC) and silicon nitride (Si$_3$N$_4$), quartz, glass or glass powder. Examples of abrasion-resistant fillers that can be used are platelet-shaped Al$_2$O$_3$, platelet-shaped SiO$_2$, TiO$_2$ and the like.

Preferably used hard substances are carbides, nitrides or borides of transition metals, natural or synthetic diamond, corundum and platelet-shaped corundum, natural or synthetic precious stones, boron, boron nitride, boron carbide, silicon carbide, silicon nitride and aluminium nitride, the non-metallic ones being preferred. Especially suitable hard substances are corundum, silicon carbide and tungsten carbide.

Pigments or fillers of a solid lubricant are furthermore suitable. Such solid lubricants are known to the person skilled in the art and are, for example, used as an additive in different application areas. Especially suitable examples of fillers or pigments of a solid lubricant are PTFE pigments, graphite pigments, molybdenum sulphide pigments and boron nitride pigments. Metal oxides can also be used. The filler made of a solid lubricant is preferably an inorganic filler.

Suitable colour pigments are all conventional and known to the person skilled in the art and generally commercially available. Examples are white pigments, for example TiO$_2$, black pigments, for example carbon black, complex iron mixed oxides, coloured pigments for all visible colours and mica pigments or interference or effect pigments. Details are to be found, for example, in G. Pfaff, "Industrial Inorganic Pigments" Wiley VCH, 2008 or H. Endriss, "Aktuelle anorganische Buntpigmente", Verlag Vincentz, 1997. The pigments may, for example, be oxides, for example spinels, rutiles, perovskites and silicates, sulphides, oxynitrides, nitrides such as BN, carbides such as SiC or elementary forms, for example carbon black and carbon. Effect pigments based on mica are, for example, the known Iriodin® pigments from the company Merck. Ceramic colour pigments are especially suitable because of their temperature stability.

If used, the quantity of fillers or pigments in the layer comprising an inorganic, glass-like matrix of an alkali silicate and/or alkaline earth silicate or the layer comprising an inorganic-organic hybrid matrix may vary within broad ranges depending on the purpose of use. However, with the optional use of fillers or pigments, preferred results can generally be achieved when the proportion of fillers or pigments in the composite layer is in the range from 1 to 35% by weight, preferably 1 to 10% by weight and, especially preferably 1.5 to 3% by weight, based on the total weight of the finished composite layer.

The finished layer comprising an inorganic, glass-like matrix of an alkali silicate and/or alkaline earth silicate or an inorganic-organic hybrid matrix and optionally one or more fillers or pigments, after thermal compression may, for example, have a layer thickness up to 20 µm, especially preferably up to 10 µm, without cracks forming during the drying and the compression. Generally, the layer thickness of this layer is at least 1 µm, preferably at least 2 µm. The layer thickness may, for example, be in the range from 3 to 8 µm.

Especially good results can be achieved when using the materials described in DE-A-102004001097 or DE 102010011185 A1 for the matrix of the layer comprising an inorganic, glass-like matrix of an alkali silicate and/or alkaline earth silicate and/or the matrix for the optionally used alkali silicate-free and/or alkaline earth silicate-free top layer. Especially with regard to the hydrolytic resistance of the anti-limescale coating, the double layer, which is constructed of the specific base layer with the top layer overlayered thereon, has achieved especially good results.

The layer used alone for the anti-limescale coating or in the double layer as a base layer comprises, in a first alternative, an alkaline earth silicate and/or alkali silicate as the inorganic, glass-like matrix. The production of such inorganic, glass-like matrices or alkaline earth silicate-containing and/or alkali silicate-containing matrices is known to the person skilled in the art. It is especially preferably a matrix, which was produced by the method and with the materials as described in DE-A-102004001097 or DE-A1-102010011185.

To produce this layer, a coating composition, which comprises a hydrolysate or condensate of a hydrolysable compound as the glass-forming matrix precursor and optionally one or more fillers or pigments, is preferably applied to the metal surface or inorganic surface and thermally compressed while forming the layer. In other words, the layer is, especially, wet-chemically applied. If the metal surface or inorganic surface is to have one or more intermediate layers, these are applied in the conventional manner and the aforementioned layer applied accordingly to this/these intermediate layer(s).

The hydrolysate or condensate of hydrolysable compounds is preferably a coating suspension or solution, especially preferably a coating sol, which is preferably produced by the sol-gel method or similar hydrolysis and condensation processes.

The hydrolysable compounds preferably comprise at least one organically modified hydrolysable silane. The hydrolysate or condensate is preferably an alkali silicate-containing or alkaline earth silicate-containing coating suspension or solution and preferably an alkaline earth silicate-containing or alkali silicate-containing coating sol.

A coating composition is preferably used as the alkali silicate-containing or alkaline earth silicate-containing coating suspension or solution, which is obtained by hydrolysis and condensation of at least one organically modified hydrolysable silane in the presence of alkali metal oxides or hydroxides or alkaline earth metal oxides or hydroxides and optionally nano-scale $SiO_2$ particles.

The coating composition for the layer for the anti-limescale layer used alone or in the double layer as a base layer is, for example, obtainable by hydrolysis and polycondensation of one or more silanes of the general formula (I)

$$R_nSiX_{4-n} \quad (I)$$

wherein the groups X, the same or different from one another, are hydrolysable groups or hydroxyl groups, the groups R, the same or different from one another, stand for hydrogen, alkyl, alkenyl and alkinyl groups with up to 4 carbon atoms and aryl, aralkyl and alkaryl groups with 6 to 10 carbon atoms and n signifies 0, 1 or 2, providing that at least one silane wherein n is 1 or 2 is used or oligomers derived therefrom, in the presence of a) at least one alkali metal and alkaline earth metal compound, preferably from the group of oxides and hydroxides or the organometallic compounds of alkali metals and alkaline earth metals and b) optionally added $SiO_2$ particles, especially nano-scale $SiO_2$ particles and/or c) optionally of alkoxides or soluble compounds of the metals B, Al, Si, Ge, Sn, Y, Ce, Ti or Zr.

The alkali metal or alkaline earth metal compound may, for example, be a compound of Li, Na, K, Mg, Ca or Ba, wherein several can also be used. These are preferably alkaline compounds, for example oxides and hydroxides of alkali metals and alkaline earth metals. These oxides and hydroxides are preferably those of Li, Na, K, Mg, Ca and/or Ba. Alkali metal hydroxides, especially NaOH and KOH are preferably used. Possible examples of organometallic compounds are alkoxides of alkali metals and alkaline earth metals, for example calcium alkoxides.

The ratio of the alkali metal and/or alkaline earth metal compound used is preferably selected such that the alkali or alkaline earth compound is used in a quantity such that the atomic ratio Si: (alkali metal and alkaline earth metal) is in the range from 20:1 to 7:1, especially from 15:1 to 10:1. In any case, the atomic ratio of silicon to (alkaline earth metal and alkali metal) is selected to be so great that the resulting coating is not water-soluble as, for example, in the case of water glass.

Explanations of the suitable silanes of the formula (I) follow. Unless otherwise stated, the details including the details on the hydrolysis and condensation conditions apply equally to silanes of the formulas (I) and (II), which can be used for the alternative (base) layer or the optionally used top layer.

Included in the above silanes of the general formula (I) is preferably at least one silane, in the general formula of which n has the value 1 or 2. At least two silanes of the general formula (I) are especially preferably used in combination. In these cases, these silanes are preferably used in a ratio such that the average value of n (on a molar basis) is 0.2 to 1.5, preferably 0.5 to 1.0. An average value of n in the range from 0.6 to 0.8 is especially preferred.

In the general formula (I) the groups X, which are the same or different from one another, are hydrolysable groups or hydroxyl groups. Specific examples of hydrolysable groups X are halogen atoms (especially chlorine and bromine), cyanates and isocyanates, alkoxy groups and acyloxy groups with up to 6 carbon atoms. Especially preferred are alkoxy groups, especially C1-4 alkoxy groups, such as methoxy, ethoxy, n-propoxy and i-propoxy. The groups X in a silane are preferably identical, methoxy or ethoxy groups being especially preferably used.

In the groups R in the general formula (I), which in the case of n=2 may be same or identical, these are hydrogen, alkyl, alkenyl and alkinyl groups with up to 4 carbon atoms and aryl, aralkyl and alkaryl groups with 6 to 10 carbon atoms. Specific examples of groups of this type are methyl, ethyl, n-propyl, propyl, n-butyl, sec-butyl and tert-butyl, vinyl, allyl and propargyl, phenyl, tolyl and benzyl. The groups may have conventional substituents but groups of this type preferably do not carry any substituents. Preferred groups R are alkyl groups with 1 to 4 carbon atoms, especially methyl and ethyl, and phenyl.

It is preferred if at least two silanes of the general formula (I) are used, wherein in one case n=0 and in another case n=1. Silane mixtures of this type, for example, comprise at least one alkyl trialkoxysilane (for example (m)ethyl tri(m)ethoxysilane) and a tetraalkoxysilane (for example tetra(m)ethoxysilane). An especially preferred combination for the starting silanes of formula (I) is methyl tri(m)ethoxysilane and tetra(m)ethoxysilane. An especially preferred combination for the starting silanes of formula (I) is methyl tri(m)ethoxysilane and tetra(m)ethoxysilane. (M)ethoxy signifies methoxy or ethoxy.

The hydrolysis and condensation of the hydrolysable starting compounds preferably takes place by the sol-gel method. In the sol-gel method, the hydrolysable compounds are hydrolysed with water, generally in the presence of acid or alkaline catalysts and at least partially condensed. The acid hydrolysis and condensation preferably takes place in the presence of acid condensation catalysts (for example hydrochloric acid, phosphoric acid or formic acid), for example at a pH of preferably 1 to 3. The coating composition for the top layer is preferably produced by means of an acid catalyst. The sol forming can be adjusted by suitable parameters, for example degree of condensation, solvent or pH, to the viscosity desired for the coating composition.

Further details of the sol-gel method are, for example described in C. J. Brinker, G. W. Scherer: "Sol-Gel Science—The Physics and Chemistry of Sol-Gel-Processing", Academic Press, Boston, San Diego, New York, Sydney (1990).

The optional and preferred fillers or pigments are preferably dispersed into this coating suspension or solution or the sol of the glass-forming matrix in order to form the coating composition. However, it is also possible to combine the fillers or pigments with the hydrolysable compounds and to carry out the hydrolysis and/or condensation in the presence of the fillers or pigments. The filler or the pigment may, for example, be added directly as a powder or as a suspension or slurry in an organic solvent to the coating composition.

The nano-scale $SiO_2$ particles optionally used in addition to the hydrolysable silanes of the general formula (I) are preferably used in a quantity such that the ratio of all the Si atoms in the silanes of the general formula (I) to all the Si atoms in the nano-scale SiO$_2$ particles is in the range from 5:1 to 1:2, especially 3:1 to 1:1. Nano-scale SiO$_2$ particles are taken to mean SiO$_2$ particles with an average particle diameter of preferably no more than 100 nm, preferably no more than 50 nm and, especially, no more than 30 nm. Conventional commercial silica products, for examples silica sols, such as the Levasile®, silica sols from Bayer AG, or pyrogenic silicas, for example the Aerosil products from Degussa, can also, for example, be used for this.

The layer used alone for the anti-limescale coating or in the double layer as a base layer comprises, in a second alternative, an inorganic-organic hybrid matrix. This is a matrix of two interpenetrating polymers, namely an inorganic condensate, preferably an inorganic heterocondensate, and a purely organic polymer. Such inorganic-organic hybrid systems are also called IPN polymers (interpenetrating polymer networks). The interpenetrating polymers can be mixed purely physically but are preferably covalently linked with one another.

The production of such inorganic-organic hybrid matrices is known to the person skilled in the art. This is preferably a matrix, which is produced, for example, by methods and with materials as described in DE-A-102006018938, DE-A-2007059423 or DE 102008011413.

To produce this layer, a coating composition, which comprises an inorganic condensate and an organic monomer, oligomer or polymer, which comprises at least one polymerisable group, is preferably applied to the metal surface or inorganic surface and hardened, especially thermally hardened while forming the layer. If the metal surface or inorganic surface is to have one or more intermediate layers, these are applied in the conventional manner and the aforementioned layer is applied correspondingly to this/these intermediate layer(s).

The condensate may be a siloxane condensate. However, the condensate is preferably a heterocondensate, which is a metallosiloxane or borosiloxane and contains heteroatom units of heteroatoms selected from B, Al, Ga, In, Tl, Ge, Ga, Sn, Pb, Ti, Zr, Hf, Sc, Y and La, which are built into the siloxane skeleton by means of oxygen bridges, and siloxane units, in which the silicon atom has a non-hydrolysable organic group, preferably a non-hydrolysable organic polymerisable group.

The heterocondensate is formed from silicon compounds and metal or boron compounds, especially by hydrolysis and condensation, preferably by the sol-gel method as described above. At least one hydrolysable silicon compound with a non-hydrolysable organic group is used as the Si component, which preferably has a polymerisable radical.

The abovementioned silanes of the general formula (I) can be used as the hydrolysable silicon compound with the non-hydrolysable organic group. The use of at least one hydrolysable silicon compound with a non-hydrolysable organic polymerisable group is preferred, for example a compound of the general formula (II)

(Rx)$_b$R$_c$SiX$_{4-b-c}$ (II)

wherein the groups Rx are the same or different and are hydrolytically non-splitable groups, which comprise at least one polymerisable group, the groups R are the same or different and are hydrolytically non-splitable groups, the groups X are the same or different and are hydrolytically splitable groups or hydroxy groups, b has the value 1, 2 or 3 and c has the value 0, 1 or 2, wherein the sum (b+c) is 1, 2 or 3. In the formula (II) b is preferably 1 and c is preferably 0, so the polymerisable organosilane of formula (II) is preferably (Rx)SiX$_3$ or (Rx)R$_c$SiX$_{3-c}$.

Suitable and preferred examples of hydrolytically splitable or hydrolysable groups X and the hydrolytically non-splitable groups R are the same as was mentioned for the groups X or R in the formula (I).

The groups Rx comprise at least one polymerisable group, by means of which a crosslinking of the forming condensate with one another or with the added organic monomers, oligomers or polymers is possible. Examples of the polymerisable group are epoxide, such as, for example, glycidyl or glycidyloxy, hydroxy, amino, monoalkylamino, dialkylamino, optionally substituted anilino, amide, carboxy, alkenyl, alkinyl, acryl, acryloxy, methacryl, methacryloxy, mercapto, cyano, isocyanato, aldehyde, keto, alkyl carbonyl, acid anhydride and phosphoric acid. These substituents are bound by means of divalent bridge groups, especially alkylene or arylene bridge groups, which can be interrupted by oxygen or —NH— groups, to the silicon atom. The bridge groups contain, for example, 1 to 18, preferably 1 to 8 and especially 1 to 6 carbon atoms. The bridge group is preferably an alkylene, especially a propylene group. Preferred polymerisable groups, by which a crosslinking is possible, are vinyl, acryl or acryloxy, methacryl or methacryloxy.

Specific examples are glycidyloxypropyltrimethoxysilane (GPTS), γ-glycidyloxypropyltriethoxysilane (GPTES), 3-isocyanatopropyltriethoxysilane, 3-isocyanatopropyldimethylchlorosilane, 3-aminopropyltrimethoxysilane (APTS). Preferred examples are vinyl silanes, acrylic silanes and methacrylic silanes, such as vinyltriethoxysilane, (meth)acryloxyalkyltrimethoxysilane and (meth)acryloxyalkyltriethoxysilane, especially (meth)acryloxypropyl-trimethoxysilane and (meth)acryloxypropyltriethoxysilane, (meth)acryloxypropyl-methyld imethoxysilane, (meth)acryloxyethyltrimethoxysilane and (meth)acryloxyethylmethyldimethoxysilane, wherein methacryloxypropyltrimethoxysilane is especially preferred.

In preferred embodiments, apart from the at least one silicon compound with a polymerisable group, one or more further silicon compounds are used as the Si component, for example silanes of the formula (I), wherein these may be hydrolysable silanes with at least one non-hydrolysable organic group and/or hydrolysable silanes without non-hydrolysable organic groups.

Used as a further component for the heterocondensate is an additional compound, especially a hydrolysable compound, of an element selected from B, Al, Ga, In, Tl, Ge, Ga, Sn, Pb, Ti, Zr, Hf, Sc, Y and La. Titanium compounds are preferred. The compounds can be used individually or as a mixture of two or more of these elements.

The metal or boron compound may be a compound of formula (III)

MX$_a$ (III)

wherein M is B, Al, Ga, In, Tl, Ge, Ga, Sn, Pb, Ti, Zr, Hf, Sc, Y and La, X is defined in formula (I), including the preferred examples, wherein two groups X can be replaced by an oxo group, and a corresponds to the valence of the element, wherein when using complex ligands a can also be greater or, in the case of multidentate ligands, can also be smaller than the valence of M. The valence of M is generally 2, 3 or 4. Optionally, the compound of formula (III) also comprises a counterion. X, apart from the substituents given in formula (I) can also be a sulphate, nitrate, a complexing agent, such as, for example, a β-diketone, a saturated or unsaturated carboxylic acid or the salt thereof, an inorganic acid or a salt thereof and an amino alcohol. The metal or boron compound is preferably a hydrolysable compound. Metal or boron alkoxides are preferred.

The alkoxides of Ti, Zr and Al, especially of Ti, are preferred as metal compounds. Suitable metal compounds are, for example, $Ti(OC_2H_5)_4$, $Ti(O-n-$ or $i-C_3H_7)_4$, $Ti(OC_4H_9)_4$, $TiCl_4$, $Ti(O-iC_3H_7)_2Cl_2$, hexafluorotitanic acid, $TiOSO_4$, diisopropoxybis(ethylacetoacetato)titanate, poly(dibutyltitanate), tetrakis(diethylamino)titanium, titanium-2-ethylhexoxide, titanium bis(triethanolamine)diisopropoxide, titanium chloride triisopropoxide, $Al(OC_2H_5)_3$, $Al(O-sec.-C_4H_9)_3$, $AlCl(OH)_2$, $Al(NO_3)_3$, $Zr(OC_3H_7)_4$, zirconium-2-ethylhexoxide, $BCl_3$, $B(OCH_3)_3$ and $SnCl_4$, $Zr(OC_3H_7)_2(OOC(CH_3)=CH_2)_2$, titanium acetylacetonate, titanium oxide bis(pentane dionate), $Ti(OC_3H_7)_3(OOC(CH_3)=CH_2)$ and $Ti(OC_2H_4)_3(allylacetoacetate)$. Of the metal compounds $Ti(O-iC_3H_7)_4$, $Ti(OC_4H_9)_4$, titanium bis(triethanolamine)diisopropoxide and $Ti(OC_3H_7)_3(OOC(CH_3)=CH_2)$ are especially preferred.

The hydrolysis and condensation to form the heterocondensate is preferably carried out in two stages. In this case, the hydrolysable silicon compound is subjected to a hydrolysis in a first stage by mixing with water. The metal or boron compound is added in a second stage when the silicon compounds have substantially been hydrolysed.

The molar ratio of Si atoms of all the Si compounds used to the metal atoms and boron atoms of all the metal and boron compounds used and mentioned above can be selected within broad ranges, but is preferably 10:1 to 1:3 and preferably 5:1 to 1:1.

For the organic compounds one or more organic monomers, oligomers or polymers are used, which in each case have one or more, preferably at least two polymerisable groups. Examples of polymerisable groups are C=C-double bonds, hydroxy, amino, carboxyl, acid anhydride groups, epoxide, isocyanate groups, acid chloride groups, nitrile, isonitrile and SH groups, wherein C=C-double bonds, such as vinyl, acrylic and methacrylic groups are preferred. Polyisocyanates, melamine resins, polyester and epoxide resins are suitable, for example, as polymers with free polymerisable groups. Preferred examples are monofunctional, bifunctional or polyfunctional acrylates and methacrylates.

Specific examples are diethyleneglycoldimethacrylate (DEGMA), triethyleneglycoldimethacrylate (TEGDMA), bisphenol A-glycidylmethacrylate (BisGMA), bisphenol A-diacrylate, diurethanedimethacrylate, urethanedimethacrylate (UDMA), Laromer®-acrylate from BASF, Ebecryl®, pentaerythrittriacrylate (PETIA), hexanediol diacrylate, trimethylolpropane triacrylate, trimethylolpropane trimethacrylate, neopentylglycoldimethacrylate, neopentylglycoldiacrylate, epoxy acrylate resins, oligomer methacrylates, such as LR 8862, LR 8907 from BASF, or oligomeric urethane acrylates, such as UA 19T from BASF.

The organic component is preferably added after adding the metal or boron compound, preferably after maturation. The weight ratio of all the inorganic components used, including the organic groups contained therein, to the purely organic components used may, for example, based on the hardened coating composition, be, for example, 95:5 to 5:95 and preferably 80:20 to 20:80. The fillers and/or pigments can optionally be added to the coating composition, analogously to how this is described above for the alternative layer.

The coating composition, which comprises an inorganic condensate and an organic monomer, oligomer or polymer, which comprises at least one polymerisable group, can be hardened after application to the metallic or inorganic surface, for example thermally and/or using conventional catalysts. The thermal hardening may, for example, take place at temperatures above 40° C. This hardening can also take place at an elevated pressure.

The optional top layer in this case preferably comprises an alkaline earth-free and/or alkali-free silicate. The production of such inorganic, glass-like matrices or alkaline earth-free and/or alkali-free silicate-containing matrices is known to the person skilled in the art. This is especially preferably a matrix, which is produced by the method and with the materials as described in DE-A-10 2004 001 097 or DE 10 2010 011 185 A1.

The optional compressed alkali metal-free and alkaline earth metal-free top layer comprises a matrix of an oxidated silicon compound, for example a silicon oxide, a polysilicic acid or a polysiloxane, in which additional components such as, for example, pigments or fillers or other additives are optionally contained. Alkali metal-free and alkaline earth metal-free in this case of course contains alkali metal ion-free and alkaline earth metal ion-free, i.e. the oxidated silicon compound of the top layer is not an alkali silicate and/or alkaline earth silicate. The expression alkali metal-free and alkaline earth metal-free does not, of course, exclude traces of alkali metal ions and alkaline earth metal ions in the top layer, which may, for example be introduced by ionogenic impurities into the components used for the coating composition. Thus, for example, the content of alkali may be up to 0.2% by weight, for example, in Levasil®, a silica sol, which is stabilised by $Na^+$ ions.

By adding Levasil® to the coating composition of the top layer, although small quantities of alkali metal would therefore be introduced, this does not lead to the formation of an alkali silicate. Expressed differently, an alkali metal-free and alkaline earth metal-free top layer or oxidated silicon compound means that the atomic ratio of Si to (alkali metal and/or alkaline earth metal) is greater than 500, especially greater than 1000.

In the silicon-oxide skeleton, some of the Si ions may optionally be replaced by other ions such as, for example, Al but this is generally not preferred. The top layer is obtainable by wet-chemical application of a coating sol obtained by the sol-gel method and the thermal compression of the coating sol (sol-gel layer) generally after drying.

The coating composition for the optional top layer is, for example, obtainable by hydrolysis and condensation of one or more silanes of the general formula (I):

$$R_nSiX_{4-n} \qquad (I)$$

wherein the groups X, the same or different from one another, are hydrolysable groups or hydroxyl groups, the groups R, the same or different from one another, stand for hydrogen, alkyl, alkenyl and alkinyl groups with up to 4 carbon atoms and aryl, aralkyl and alkaryl groups with 6 to 10 carbon atoms and n signifies 0, 1 or 2, providing that at least one silane wherein n is 1 or 2 is used, or oligomers derived therefrom. The hydrolysis and condensation can optionally be carried out in the presence of a) optionally added $SiO_2$ particles, especially nano-scale $SiO_2$ particles and/or b) optionally of alkoxides or soluble compounds of the metals B, Al, Si, Ge, Sn, Y, Ce, Ti or Zr.

The hydrolysate or condensate of hydrolysable compounds is preferably a coating suspension or solution, especially preferably a coating sol, which are produced by the sol-gel method or similar hydrolysis and condensation processes.

The hydrolysable compounds preferably comprise at least one organically modified hydrolysable silane. The hydrolysate or condensate is especially preferably an alkali- or alkaline earth-free coating suspension or solution and preferably an alkaline earth-free or alkali-free coating sol.

Preferably used as the silicate-containing coating suspension or solution is a coating composition, which is obtained by hydrolysis and condensation of at least one organically modified hydrolysable silane in the absence of alkaline metal or alkaline earth metal oxides or hydroxides and optionally in the presence of nano-scale $SiO_2$ particles.

The silanes of formula (I) correspond to the silanes of formula (I) used in the layer comprising an alkali silicate and/or alkaline earth silicate. The detailed information listed there for the silanes of formula (I) that can be used apply analogously here, as long as nothing else is stated. The optional top layers generally have a layer thickness of 1 to 15 µm, preferably 4 to 12 µm and especially 6 to 10 µm.

Both the coating composition for the layer used alone or as a base layer and the optional top layer may contain additives that are conventional in the paint industry, for example additives controlling the rheology and the drying behaviour, wetting and flow-control agents, defoamers, surfactants, solvents, dyes and pigments, especially colouring pigments or effect pigments. Furthermore, conventional commercial matting agents, for example micro-scale $SiO_2$ or ceramic powders may be added in order to achieve matted layers with anti-fingerprint properties. If used, the hydrolysis and polycondensation of the silanes can take place in the presence of matting agents, for example micro-scale $SiO_2$ or ceramic powders. However, these may also be added later to the coating composition.

Both the coating composition for the layer used alone or as a base layer and also that for the optional top layer can be applied by the conventional wet-chemical coating techniques, for example dipping, casting, centrifuging, spraying, roller application, brushing on, application by doctor blade or curtain coating. Printing methods, such as, for example, screen printing can also be used.

The coating composition applied to the metallic or inorganic surface for the layer used as the single layer or base layer comprising an inorganic, glass-like matrix of an alkali silicate and/or alkaline earth silicate and for the optional top layer is normally dried at room temperature or a slightly elevated temperature, for example up to 100° C., especially to 80° C., before it is thermally compressed to form a glass-like layer. The thermal compression can optionally also take place by UV, IR or laser radiation.

When using the double layer, the procedure for compressing the layers can be such that firstly the base layer is compressed followed by the top layer or the two layers in the stack. If nothing else is stated, the following details on the conditions of the compression apply equally to the layer used as a single layer or base layer comprising an inorganic, glass-like matrix of an alkali silicate and/or alkaline earth silicate and to the optional top layer, but not to the layer comprising an inorganic-organic hybrid matrix.

The compression temperatures may vary within broad ranges and of course also depend on the materials used. Suitable ranges are known to the person skilled in the art. The thermal compression generally takes place in the area at a temperature in the range from 300 to 800° C., preferably from 350 to 700° C. Owing to the thermal compression, any organics optionally present are also optionally combusted out completely or to a desired very low residual content, so a glass-like inorganic layer is obtained. The coating composition may, for example, on high-grade steel or steel surfaces already be converted at relatively low temperatures, generally from 400° C., into dense $SiO_2$ films or alkali silicate and/or alkaline earth silicate films.

The layers can be thermally compressed both under a normal or oxidising atmosphere and under protective gas or a reducing atmosphere or with proportions of hydrogen. Especially, the layer can be compressed under atmospheric or oxidising, inert or reducing conditions or under such conditions changing one after the other. The layer can be compressed in one or more stages. The thermal compression can comprise two or more stages in different conditions or those changing one after the other, which is generally also preferred. The thermal compression can thus take place in a first stage at an oxidising atmosphere and relatively low temperatures in order to combust out the organics and then in a second stage at an inert atmosphere and relatively high temperatures for the final compression.

Thus, for example, compression can take place in the first stage in an oxygen-containing atmosphere, for example on air or alternatively in a vacuum, for example at a residual pressure ≤15 mbar. The final temperature may be in the range from 100 to 500° C., preferably 150 to 450° C., the precise temperatures depending inter alia on the selected conditions and the desired further treatment.

During compression in oxygen-containing atmosphere it is preferred to use compressed air as the process gas. In this case, 3 to 10 times the furnace interior volume of process gas is preferably introduced per hour, the excess pressure in the furnace interior being about 1 to 10 mbar, preferably 2 to 3 mbar. At the same time, during this process step, the steam partial pressure in the process gas can be adjusted by introducing water into the compressed air stream before entering the furnace. Thus, the microporosity of the precompressed, or else the finally compressed layer, can be adjusted. To produce coatings that are to be completely compressed at temperatures from 450 to 500° C. it is preferred, for example, to adjust a relative air humidity of the process gas of 50 to 100% at temperatures up to a range from 200 to 400° C., especially preferably from 250 to 350° C. (water quantity based on the room temperature). The addition of water is stopped for the further compression process up to the above-mentioned final temperature of 450 to 500° C.

In the second heat treatment stage, a further compression takes place with the formation of a glass-like layer. The second heat treatment stage is preferably carried out up to a final temperature in the range from 350 to 700° C., preferably 400 to 600° C. and especially preferably 450 to 560° C.

These temperature ranges are also preferred when the compression is carried out in one step. The second stage preferably takes place in a low-oxygen atmosphere or oxygen-free atmosphere with only a very small oxygen content (≤0.5% by volume). Work may, for example, take place under normal pressure or in a vacuum. An inert gas such as nitrogen with an excess pressure of 1 to 10 mbar, preferably 1 to 3 mbar, can be used as the low-oxygen atmosphere.

More than two compression stages can also be used. For example, it may be expedient for a further compression stage under reducing conditions, for example with forming gas, to follow the two above-mentioned stages. Further details on suitable compression stages and the respective conditions can also be found in DE-A-102004001097 or DE 102010011 185 A1.

The thermal compression generally takes place according to a controlled temperature programme, the temperature being increased at a specific speed up to a maximum final temperature. The above-mentioned temperatures for the compression relate to this maximum final temperature. The residence times at the maximum temperatures in the compression stages are generally 5 to 75 min and preferably 20 to 65 min.

Thus glass-like layers can be obtained on metallic and also on inorganic surfaces, which have a good anti-limescale effect, a high hydrolytic resistance and high abrasion resistance. They also form a hermetically sealing layer, which prevents or drastically reduces the oxygen influx to the metallic or inorganic surface even at relatively high temperatures and ensures excellent corrosion protection and also helps to avoid soiling, for example due to fingerprints, water, oil, grease, surfactants and dust. The same advantages can be achieved if, instead of the layer comprising an inorganic, glass-like matrix of an alkali silicate and/or alkaline earth silicate, a layer or base layer comprising an inorganic-organic hybrid matrix is used.

One or more intermediate layers can optionally be provided between the metal surface or inorganic surface and the anti-limescale coating, for example in order to improve the adhesion or in order to ensure an additional protection. Inorganic, glass-like layers are generally used for this. The intermediate layers can also be applied wet-chemically or by other methods, such as, for example, CVD or PVD, wherein they can be compressed separately or preferably together with the anti-limescale coating. The conditions which were described above for the anti-limescale coating can be used as the conditions for thermal compression but, depending on the composition, other conditions may also be expedient.

The object or material, which is provided with the antitimescale coating, with a metal surface or inorganic, especially ceramic or mineral surface, can be a semi-finished product, such as plates, metal sheets, pipes, rods or wires, a component or a finished product. It can be used for systems, tools, domestic equipment, electric components, machines, vehicle parts, especially car parts, production systems, facades, conveying tools, safety valves, pipe lines, heat exchangers or parts thereof.

The anti-limescale coating is, especially, suitable for objects or materials with a metal surface such as metal housings of electronic equipment, metallic components for optical equipment, metallic parts of vehicles in the internal and external area, metallic components in mechanical engineering and systems engineering, motors, metallic components of medical equipment, metallic components of household equipment, other electric equipment and turbines, domestic equipment such as, for example, containers, knives, metal facade components, metal components of lifts, parts of conveying devices, metallic parts of furniture, garden equipment, agricultural machines, fittings, motor components and production systems in general and, especially, for pipe lines, sand control systems and safety valves in the conveyance or storage of oil and gas.

Sand control systems are used in the conveyance of oil or gas so that sand or other solid impurities are kept back during conveyance. For this purpose, the sand control systems contain, for example, gravel packs, packs of ceramic particles or proppants, generally moulded bodies made of sand. The anti-limescale coating system according to the invention is surprisingly also suitable for coating mineral objects or materials, ceramic particles or rocks, such as gravel, grit or sand, especially for gravel packs, packs of ceramic particles and proppants such as are used as sand control systems.

The object with at least one metal surface or inorganic surface is especially preferably a storage or transport device for water or media containing water, the anti-limescale coating being able to be applied to at least one metal surface or inorganic surface of the storage or transport device. This storage or transport device is preferably a boiler, a tank, a pipeline or a valve for water or media containing water, a pipeline and a safety valve being especially preferred.

The medium containing water is preferably a water-containing crude oil or natural gas. Such oils and gases containing water occur, for example, in oil or gas conveyance or oil or gas storage. The storage or transport device is therefore especially preferably a pipeline, a sand control system (gravel pack, proppants) or a valve, especially a safety valve, in the conveyance of oil or gas or storage of oil or gas. Owing to the anti-limescale coating, the limescale deposit in oil or gas pipes used to convey or store crude oil or natural gas, in safety valves or sand control systems belonging to the line system, can be significantly reduced or even completely prevented.

The invention accordingly also relates to a method for transporting or storing water or a medium containing water, in which the water or the medium containing water is transported by an object or is stored in an object, the object having the described anti-limescale coating on at least one metal surface or inorganic surface.

The invention will be further described by the examples below, which are not to restrict the invention in any way.

EXAMPLE 1 (DOUBLE LAYER SYSTEM)

Base Layer 25 ml (124.8 mMol) methyltriethoxysilane (MTEOS) are stirred with 7 ml (31.4 mMol) tetraethoxysilane (TEOS) and 0.8 g (20 mMol) sodium hydroxide overnight (at least 12 hours) at room temperature until the entire sodium hydroxide has dissolved and a clear yellow solution is present. 3.2 ml (177.8 mMol) water are then slowly dripped in at room temperature, during which the solution heats up. Once the addition of water has ended, the clear yellow solution is stirred at room temperature until it has cooled again, and it is then filtered by means of a filter with a pore size of 0.8 µm.

Production of a Coating Solution with Pigments 4 g of the red pigment LavaRed® from the company Merck AG are dispersed in the presence of 8 g butylglycol as a compatibiliser/surface modifier and levelling agent in 80 g of the base layer system with powerful stirring.

In the process, an agglomerate-free dispersion having a viscosity of about 15 mPas is achieved at 23° C. which is suitable for use in an automatic spray coating system.

Top Layer System 65.5 g MTEOS and 19.1 g TEOS are mixed and divided into two halves. 14.2 g Levasil 300/30 and 0.4 ml HCl (37%) are added to one half while stirring (until the clear point is reached). The second half of the silane mixture is then added. This mixture is allowed to stand overnight. For activation, water is added to the batch (10% by weight) (adjustment of the ROR to 0.8).

Application and Hardening of the Layers

Base layer: as the base layer, the coating solution with pigments is applied to a metal substrate by means of spraying in such a way that the wet film thickness is about 15 µm. The layer is then heated to 450 to 550° C. depending on the metallic substrate used.

Top layer: the top layer is applied by means of spraying with a wet film thickness of about 10 µm. The layer is then heated to 450 to 550° C. depending on the metallic substrate.

EXAMPLE 2 (DOUBLE LAYER SYSTEM)

Base paint: 25 ml (124.8 mMol) methyltriethoxysilane (MTEOS) are stirred with 7 ml (31.4 mMol) tetraethoxysilane (TEOS) and 0.8 g (20 mMol) sodium hydroxide overnight (at least 12 hours) at room temperature until the entire sodium hydroxide has dissolved and a clear yellow solution is present. 3.2 ml (177.8 mMol) water are then slowly dripped in at room temperature until the solution heats up. After the addition of water has ended, the clear yellow solution is stirred at room temperature until it has cooled again and it is then filtered by means of a filter with a pore size of 0.8 µm.

Pigment suspension (a): a mixture of 50% by weight Alusion $Al_2O_3$ (platelet-shaped corundum, particle size $d_{90}$=18 µm) in 2-propanol is homogenised in a dispermat for 15 minutes while cooling at 20° C. and the content of the suspension is then determined by vaporising a sample of the end product (solid content 40.0% by weight).

Pigment suspension (b): a mixture of 50% by weight F1000 $Al_2O_3$ (blasting corundum, broken, particle size 1 to 10 µm) in 2-propanol is homogenised in a dispermat for 10 minutes while cooling and the content of the suspension is then determined by vaporising a sample of the end product (40.0% by weight).

Coating Paint

To produce the coating paint 0.9 kg of the base paint are prepared and then 100 g ethylene glycol monobutyl ether are added and stirred. 30 g pigment suspension (a) and 45 g pigment suspension (b) are added while stirring and stirring takes place for a further 20 minutes.

Coating

After filtration by means of a 100 µm filter screen, the coating paint (single layer) is sprayed on in an industrial flat spraying system to a wet film thickness of 11 µm onto the high-grade steel parts pre-cleaned in a conventional commercial alkaline cleaning bath and then dried at room temperature for 15 minutes.

Following the coating, the coated parts are introduced into a retort furnace that can be evacuated, hardened in a first heating step at 200° C. in air and then in pure nitrogen at 500° C. in 1 h. The hardened glass layer has a layer thickness of 4 µm.

Test for Anti-Limescale Effect

The metal substrates with an anti-limescale coating produced in Examples 1 and 2 were subjected to the following test. For comparison, the test was also carried out with the metal substrates without an anti-limescale coating used in Examples 1 and 2.

1.23 g $Ca(OH)_2$ were dissolved in 1000 ml distilled water at room temperature. $CO_2$ was introduced into the saturated solution until no further $CaCO_3$ precipitation occurs. The coated or uncoated sample was immersed in the solution in a desiccator for 3 days at 85° C. In order to ensure that the sample is completely immersed, the $CaCO_3$ suspension is filled up daily. Once the immersion time had expired, the sample was removed, rinsed with water and the layer and the quantity of $CaCO_3$ deposited thereon were evaluated. The evaluation leads to the result that the layer is completely intact. Adhesion tests produce a result of GT/TT=0/0. With regard to the anti-limescale effect, the uncoated comparison samples exhibit a clear limescale residue after rinsing with water. The coated sample exhibits no limescale residues after rinsing.

The invention claimed is:

1. An anti-limescale coating on at least one metal surface or inorganic surface of an object or material, wherein the anti-limescale coating is made of:
   a layer comprising an inorganic-organic hybrid matrix;
      wherein the inorganic-organic hybrid matrix is a matrix of two interpenetrating polymers, the polymers being an inorganic condensate and an organic polymer, representing an interpenetrating polymer network (IPN).

2. The anti-limescale coating according to claim 1, wherein
   the layer further comprises one or more fillers or pigments.

3. The anti-limescale coating according to claim 2, wherein the particle diameter ($d_{50}$ value), averaged with respect to the volume, of the filler or the pigment is within the range of 1 to 20 µm.

4. The anti-limescale coating according to claim 1, wherein the object or the material with a metal surface or inorganic surface is a storage or transport device for water or media containing water.

5. The anti-limescale coating according to claim 1, wherein the object or the material is a boiler, a tank, a pipeline or a valve.

6. The anti-limescale coating according to claim 1, wherein
   the layer thickness of the layer comprising an inorganic-organic hybrid matrix is no greater than 20 µm; or
   one or more intermediate layers are arranged between the metal surface or inorganic surface and the anti-limescale coating.

7. The anti-limescale coating according to claim 2, wherein
   the proportion of fillers and/or pigments in the layer comprising an inorganic-organic hybrid matrix is in the range from 1 to 35% by weight, based on the total weight of the layer.

8. The anti-limescale coating according to claim 1, wherein the anti-limescale coating is made of the layer comprising an inorganic-organic hybrid matrix, and is obtained by wet-chemical application of a coating composition on at least one metal surface or inorganic surface of the object or the material and hardening the coating composition, the coating composition comprising a heterocondensate and an organic monomer, oligomer or polymer, which comprises at least one polymerisable group, and the heterocondensate is a metallosiloxane or borosiloxane and contains heteroatom units of heteroatoms selected from B, Al, Ga, In, Tl, Ge, Ga, Sn, Pb, Ti, Zr, Hf, Sc, Y and La, which are incorporated in the siloxane skeleton by means of oxygen bridges, and siloxane units, in which the silicon atom has a non-hydrolysable organic group.

9. A storage or transport device for water or media containing water with an anti-limescale coating on at least one metal surface or inorganic surface of the storage or transport device, wherein the anti-limescale coating has a layer comprising an inorganic-organic hybrid matrix, wherein the inorganic-organic hybrid matrix is a matrix of two interpenetrating polymers, the polymers being an inorganic condensate and an organic polymer, representing an interpenetrating polymer network (IPN).

10. The storage or transport device according to claim 9, wherein the device is a boiler, a tank, a pipeline or a valve.

11. A method for transporting or storing water or a medium containing water, wherein the water or the medium containing water is transported by an object or is stored in an object, wherein the object comprises at least one metal surface or inorganic surface, which has an anti-limescale coating made of a layer comprising an inorganic-organic hybrid matrix, wherein the inorganic-organic hybrid matrix is a matrix of two interpenetrating polymers, the polymers being an inorganic condensate and an organic polymer, representing an interpenetrating polymer network (IPN).

12. The method according to claim 11, wherein the object is in a conveying system, in which water-containing oil or gas is conveyed or transported.

13. The anti-limescale coating layer of claim 8, wherein the silicon atom has a non-hydrolysable organic polymerisable group.

14. The anti-limescale coating according to claim 1, wherein the filler or the pigment is selected from at least one of abrasive fillers, solid lubricants and colour pigments.

15. The anti-limescale coating according to claim 4, wherein the object or the material with a metal surface or inorganic surface is a storage or transport device for media containing water, and the medium containing water is water-containing crude oil or natural gas.

16. The anti-limescale coating according to claim 5, wherein the object or the material is a safety valve, which is used for conveying oil or gas or storing oil or gas.

* * * * *